(12) United States Patent
Scroggie et al.

(10) Patent No.: US 7,337,505 B1
(45) Date of Patent: Mar. 4, 2008

(54) PANEL FASTENER

(75) Inventors: Derek Scroggie, Macomb, MI (US); Robert Osterland, East China, MI (US)

(73) Assignee: Illinois Tool Works Inc, Glenview, IL (US)

( * ) Notice: Subject to any disclaimer, the term of this patent is extended or adjusted under 35 U.S.C. 154(b) by 0 days.

(21) Appl. No.: 11/717,257

(22) Filed: Mar. 13, 2007

(51) Int. Cl.
*F16B 5/12* (2006.01)
(52) U.S. Cl. ........................................ 24/297
(58) Field of Classification Search .......... 24/289–295, 24/297, 458, 453, 666, 667, 669, 701, 702; 411/508–510, 45–48, 182, 480, 533, 902, 411/903, 349, 913, 112, 173–175; 403/397, 403/408.1, 326; 52/716.7, 718.06, 716.5, 52/716.6, 716.8, 718.03, 704; 174/138 D; 296/146.7, 39.1, 214
See application file for complete search history.

(56) References Cited

U.S. PATENT DOCUMENTS

2002/0194710 A1* 12/2002 Dickinson et al. ............ 24/295
2003/0159256 A1* 8/2003 Clarke .......................... 24/297
2004/0016088 A1* 1/2004 Angellotti .................... 24/297
2004/0223805 A1* 11/2004 Benedetti et al. ........... 403/316

* cited by examiner

*Primary Examiner*—James R. Brittain
(74) *Attorney, Agent, or Firm*—Mark W. Croll; Paul F. Donovan

(57) ABSTRACT

A w-based panel fastener for securing a molding to a panel includes a nose and a pair of offset wings extending from the nose. The nose has a longitudinal length, an outer surface, and an inner surface opposite the outer surface. The wings are spaced from each other along the longitudinal length of the nose, and each of the wings includes a guide portion extending from the outer surface of the nose and a retainer portion extending generally from the inner surface of the nose. The spaced apart guide portions of the wings form a surface for initial insertion into the opening in the panel. The retainer portion of the wings is adapted to interfit with the opening in the panel to secure the fastener to the panel.

14 Claims, 4 Drawing Sheets

PANEL FASTENER

FIELD OF THE INVENTION

The present invention relates generally to a retainer for fastening a molding to a panel, and more particularly to novel retainer design that provides superior installation, retention, removal and servicing capabilities.

BACKGROUND OF THE INVENTION

Automobile components, such as door trim panels, claddings, wheel lips and body side moldings are typically attached to vehicle panels comprised of plastic, sheet metal or another substrate material using various clips, such as conventional "w-based" clips. An exemplary conventional connection system installation using such w-based clips includes an exterior component affixed to a panel by means of the w-based clip. The installation process generally includes drilling or punching a slot or hole in the panel and subsequent insertion and snap-fitting of wings of the w-based clip, which is installed onto the exterior component, into the slot.

One common type of w-based clip, known as an "offset wing" clip, includes a solid, rounded nose that makes initial contact with the panel and is forced through the opening in the panel. A pair of wings extend from opposite sides of the nose for holding the retainer in the slot. The wings are commonly offset along the length of the bridge, and they each include a first portion that angles outwardly and a second portion that angles inwardly. In use, the offset wing clip is inserted by forcing the nose and the wings through the slot in the panel. The first portion of the wings flexes inwardly during insertion until it passes through the slot. The wings then expand outwardly to fill the hole, with the second portion of the wings engaging the hole to hold the retainer in place.

One drawback of the conventional offset wing retainer is the inability to effectively control the flexibility of the wings. As a result, it is difficult to control the forces that are required to insert the retainer into the sheet metal slot, to remove the retainer from the slot and to hold the retainer in the slot in the final assembly. This inability to control insertion and removal forces is especially problematic in situations where the retainer must perform to specified insertion and removal standards, and makes it difficult to adapt a particular retainer design to meet a variety of specifications. Accordingly, there remains a need for a panel retainer, and particularly an offset wing w-base retainer, that provides controllable insertion and removal forces without sacrificing retention values, manufacturing cost and efficiency.

SUMMARY OF THE INVENTION

The above-mentioned problems are overcome by the present invention, which provides an offset wing w-base retainer with a nose that is formed by a pair of interposing guide extensions.

In one embodiment, the retainer includes a collar, a pair of posts extending from the collar, and a bridge joining the distal ends of said posts. The bridge has a longitudinal length between the posts, an inner surface facing the collar, an outer surface opposite the inner surface, and first and second lateral sides. First and second wings extend from the bridge generally toward the collar with the first wing adjacent the first lateral side and the second wing adjacent to the second lateral side. The wings are offset along the longitudinal length of the bridge. The guide extensions extend from the outer surface of said bridge and are separated by a gap. The first guide extension is positioned opposite the first wing and the second guide extension is positioned opposite the second wing. In one embodiment, a portion of material is removed from the inner surface of each guide extension. This removal of material may provide the inner surface of each guide extension with a concave shape.

In another embodiment, a fin extends from the outer surface of the bridge and is located in the gap between the guide extensions. The fin may extend above the outer edge of the guide extensions.

In another embodiment, the wings each include a first portion that extends from the bridge and angles generally away from the posts, a second portion that extends from the first portion and angles generally toward the posts, an outer surface and an inner surface. A support rib extends from the inner surface. At least a portion of the support ribs extends from the first portion of the wing, and at least a portion of the rib extends from the second portion of the wing.

The present invention provides an offset wing, w-base retainer that enables control of the insertion and removal forces of the retainer, while providing for the proper hold force in the assembled position. The guide extensions function similar to the solid, rounded nose of a conventional offset wing retainer, but provide greater flexibility, and increased control of the flexibility, of the wings of the present invention. The separation of the guide extensions opposite each of the wings provides an adequate guide for inserting the retainer into the panel while allowing each wing to flex essentially independently from the other. The size of the gap between the guide extensions can be varied depending on the desired flexibility of the wings, and the size, shape and removal of material from the guide extensions enables additional control of the flexibility of the wings. The fin acts as an additional guide for insertion of the retainer and also protects the guide extensions, and the support rib on the back side of the wing increases the strength of the wings without sacrificing the ability of the wings to flex with respect to the bridge.

Other features and advantages of the invention will become apparent to those skilled in the art upon review of the following detailed description, claims and drawings in which like numerals are used to designate like features.

Figure 1:
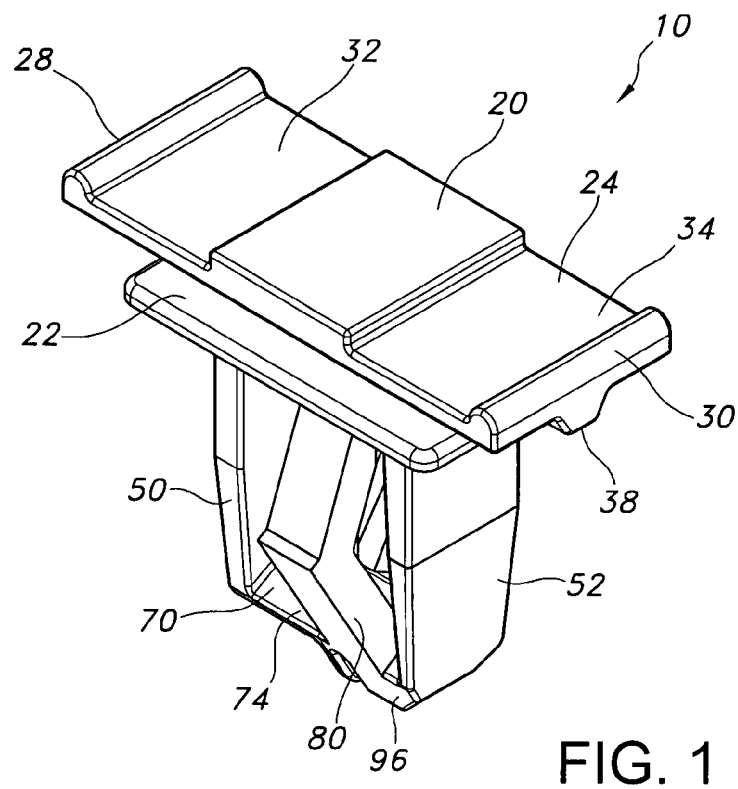
FIG. 1 is a bottom perspective view of a panel fastener according to one embodiment of the present invention.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE PREFERRED EMBODIMENTS

Figure 7:
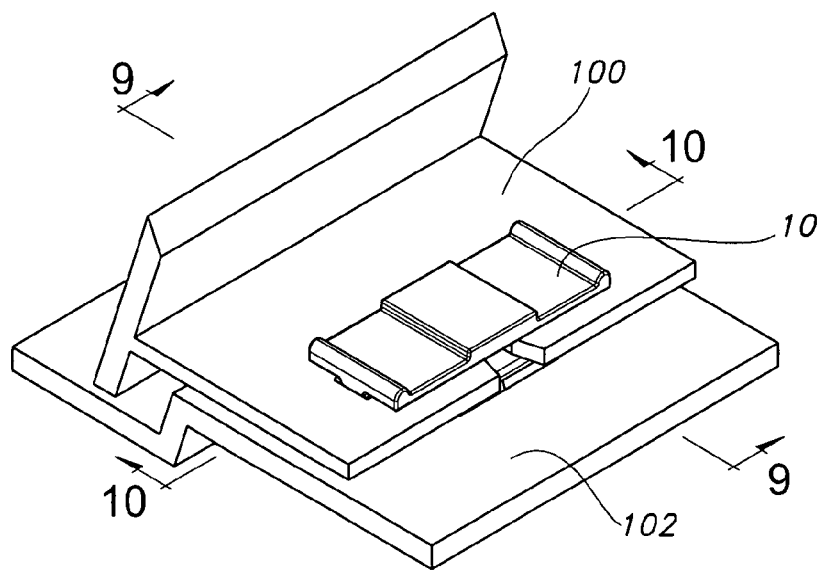
FIG. 7 is a perspective view of the panel fastener assembled with a molding and a panel.

A panel fastener according to one embodiment of the present invention is shown in FIG. 1 and generally designated 10. As shown in FIG. 7, the fastener 10 is designed to secure a molding 100 to a panel 102. For purposes of illustration, an exemplary molding 100 and panel 102 are shown in FIGS. 7-10. The molding 100 is typically a plastic, injection molded part, that may form, for instance, a portion of an automobile door trim panel. In the illustrated exemplary embodiment, the molding 100 is a flange with a keyhole shaped opening 103 to receive a portion of the retainer 10. The molding 100 may also include a pair of windows 105, 107 on opposite sides of the opening 103. The panel 102 is typically a sheet metal piece, plastic piece, or another substrate material, that may form, for instance, an automobile door. The exemplary panel 102 includes a slot 109 into which the retainer 10 may be inserted.

Figure 4:
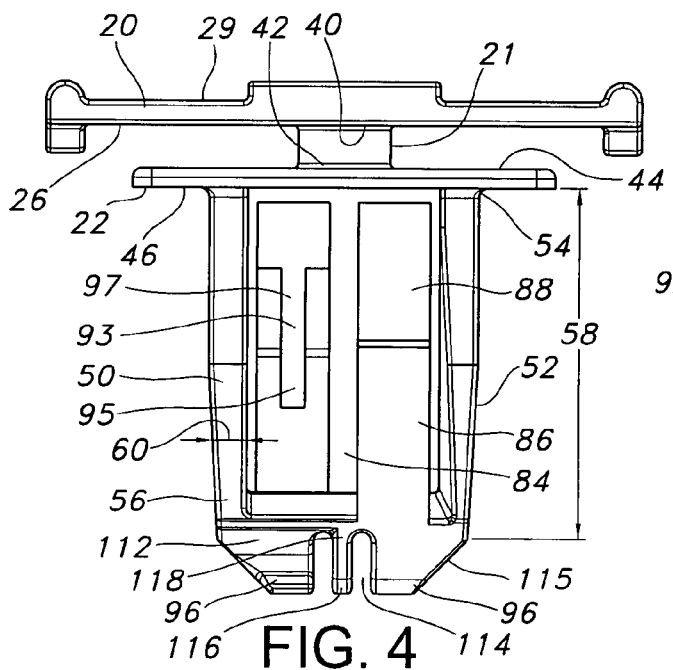
FIG. 4 is a front view of the panel fastener thereof.
Figure 6:
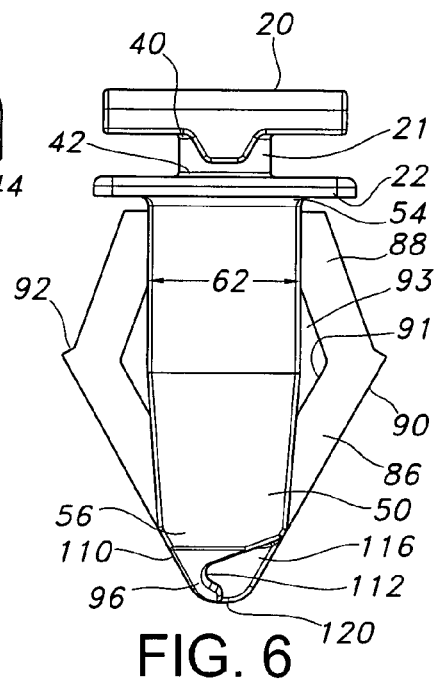
FIG. 6 is a side view of the panel fastener thereof.
Figure 5:
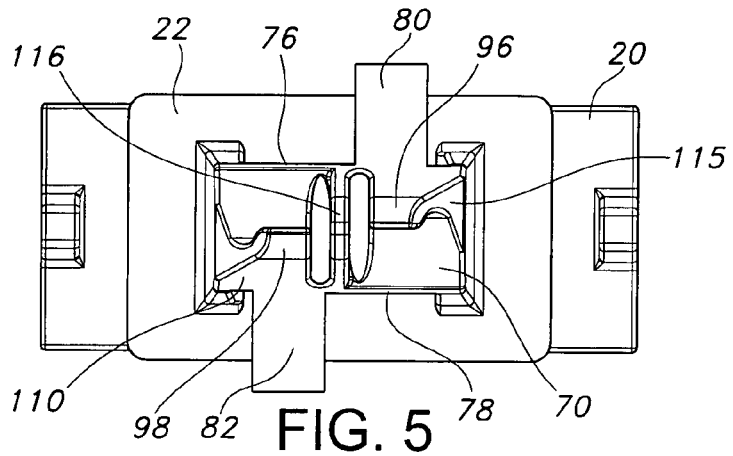
FIG. 5 is a top view of the panel fastener thereof.

The fastener 10 is typically made of injection molded plastic, but may be comprised of a variety of materials. In one embodiment, the fastener includes a head plate 20, a collar 22, and a neck 21 joined between the head plate 20 and the collar 22 and forming a gap between the head plate 20 and the collar 22. In the illustrated embodiment, the head plate 20 is a generally flat, rectangular plate having a lower surface 24, an upper surface 26, and first and second longitudinal ends 28 and 30. The lower surface 24 includes two notches 32 and 34 that provide portions of reduced thickness in the head plate 20. These reduced thickness portions increase the flexibility of the head plate 20. Additional notches may be included in a variety of shapes, sizes and locations depending on the desired flexibility of the head plate 20. In one embodiment, a pair of locking tabs 36 and 38 extend from the upper surface 26 of the head plate 20 adjacent to the longitudinal ends 28 and 30. The locking tabs 36 and 38 interfit with windows 105, 107 in the molding 100 (described in more detail below) to provide a secure attachment of the fastener to the panel, while also preventing rotation of the panel fastener 10 with respect to the molding 100. As shown in FIGS. 4 and 6, the neck 21 is generally cylindrical and includes a first end 40 attached to the head flange 20 and a second end 42 attached to the collar 22. In one embodiment, the collar 22 is also a generally flat plate that includes a lower surface 44 attached to the neck 21 and an upper surface 46 opposite the lower surface 44.

Figure 2:
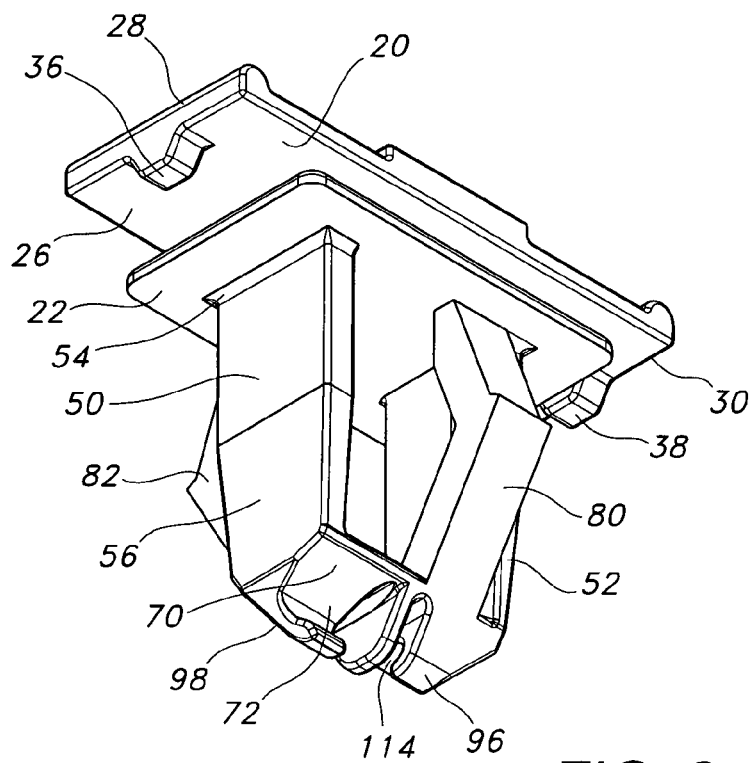
FIG. 2 is a top perspective view of the panel fastener thereof.
Figure 3:
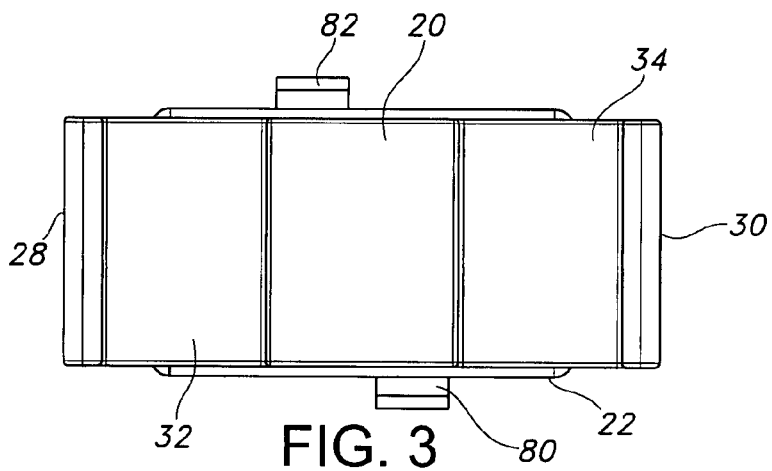
FIG. 3 is a bottom view of the panel fastener thereof.

Referring to FIGS. 2 and 4, a pair of posts 50, 52 extend from the upper surface 46 of the collar 22. In one embodiment, the posts 50, 52 each include a base 54 adjacent to the collar 22 and a distal end 56 defining a height 58 between the base 54 and the distal end 56. The posts 50, 52 also each include a thickness 60 generally perpendicular to the height 58 and a width 62 generally perpendicular to the thickness 60. In the illustrated embodiment, the width 62 tapers from the base 54 to the distal end 56. As described in more detail below, the tapered shape of the posts 50, 52 allows the posts to tightly engage slot 109 in the panel 102 even in cases where the size of the slot 109 varies slightly from panel to panel. The distal ends 56 of the posts 50, 52 are joined by a bridge 70. The bridge 70 is generally flat, and defines a longitudinal length extending between the posts 50, 52. The bridge additionally includes an upper surface 72, a lower surface 74, and first and second lateral sides 76, 78.

A pair of wings 80, 82 extend from the bridge 70 generally toward the collar 22. In one embodiment, a first wing 80 extends from the bridge adjacent the first lateral side 76 proximate to the first post 50 and a second wing 82 extends from the bridge adjacent the second lateral side 78 proximate to the second post 52, such that the wings are offset along the length of the bridge 70. In one embodiment, the wings 80, 82 are offset along the length of the bridge 70 such that they define a gap 84 between the wings 80, 82. The gap 84 is controlled to provide clearance between the wings 80, 82 when they are flexed inwardly. It also is designed so that the wings will interact to support each other if a cross load is applied. Each wing 80, 82 includes a first portion 86 extending from the bridge 70 and a second portion 88 extending from the first portion 86. The first portion 86 angles outwardly from the posts 50, 52 and the second portion angles generally toward the posts 50, 52. Each wing additionally includes an outer surface 90, an inner surface 91, and a ledge 92 extending from the outer surface 90. As illustrated, the ledge 92 is positioned at the junction between the first 86 and second 88 portions of the wings 80, 82. The ledge 92 includes a lower surface 94 that forms an angle with the second portion 88 of the wings 80, 82. As described in more detail below, in use, the lower surface 94 of the ledge 92 impedes removal of the retainer 10 from the panel 102. The angle between the lower surface 94 and the second portion 88 can be varied depending on the desired removal force. In embodiment, each wing 80, 82 also includes a support rib 93 extending from the inner surface 91 to provide the wing 80, 82 with additional strength. In the illustrated embodiment, the support rib 93 extends from the inner surface 91 with a first portion 95 of the support rib 93 extending from the first portion 86 of the wing 80 and a second portion 97 of the support rib 93 extending from the second portion 88 of the wing 80. The support rib 93 strengthens the wings 80, 82 in the area of the junction between the first 86 and second 88 portions of the wings 80, 82 without substantially altering the flexibility of the wings 80, 82 with respect to the bridge 70.

A pair of interposing guide extensions 96, 98 extend from the upper surface 72 of the bridge 70. In one embodiment, the guide extensions 96, 98 act as a nose for guiding the retainer into the slot or hole 109 in the panel. In the illustrated embodiment, the first guide extension 96 extends from the bridge 70 opposite the first wing 80, and the second guide extension 98 extends from the bridge 70 opposite the second wing 82. In one embodiment, the guide extensions 96, 98 each include an outer surface 110 that angles inwardly generally in line with the first portion 86 of the wings 80, 82. The guide extensions 96, 98 additionally include an inner surface 112. In one embodiment, material is removed from the inner surface 112 to increase the flexibility of the wings. As shown, the inner surface 112 of each guide extension 96, 98 is cut so that it is concave. The guide extensions 96, 98 may each also include a longitudinal edge 115 that angles inwardly along the longitudinal length of the bridge 70. The angle of the longitudinal edges 115 can be varied to provide a lead-in for the retainer 10 as it is inserted into the slot 109 in the panel 102. The guide extensions may be separated by a gap 114 that allows each guide extension 96, 98 and its corresponding wing 80, 82 to flex independently from the other guide extension 96, 98 and wing 80, 82. The width of the gap 114 may be varied as desired to control the flexibility of the wings 80, 82. An increase in the size of the gap 114 also increases the flexibility of the wings 80, 82. In one embodiment, a fin 116 is disposed on the bridge within the gap 114. In one embodiment, the fin 116 extends from the upper surface 72 of the bridge 70 and includes a fin base 118 that spans the width of the bridge 70 from the first lateral side 76 to the second lateral side 78. The fin 118 may have a rounded outer edge 120 that provides a nose to enable easier insertion of the retainer 10 into the panel 102. In the illustrated embodiment, the outer edge 120 of the fin 118 extends above the guide extensions 96, 98 to protect the guide extensions 96, 98 during insertion.

In operation, the retainer 10 is attached to the molding 100 by inserting the neck 21 into the keyhole shaped opening 103 in the molding, with the molding fitting between the head plate 20 and the collar 22. The notches 32 and 34 allow the head plate 20 to flex as the neck 21 is inserted into the opening 103. In one embodiment, the neck 21 snap-fits into the opening 103. The locking tabs 36 and 38 may fit into the windows 105 and 107 to provide a secure attachment and prevent rotation of the retainer 10 relative to the molding 100.

Figure 8:
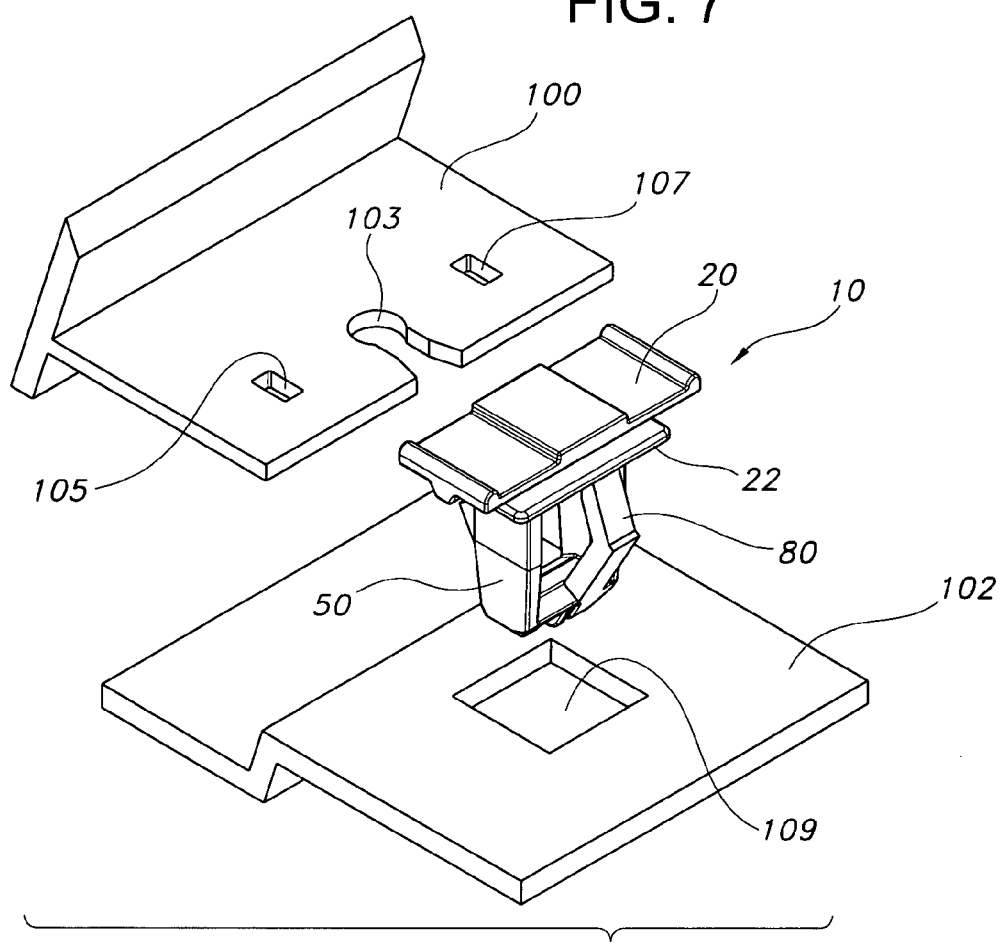
FIG. 8 is an exploded view of the panel fastener, molding and panel.
Figure 9:
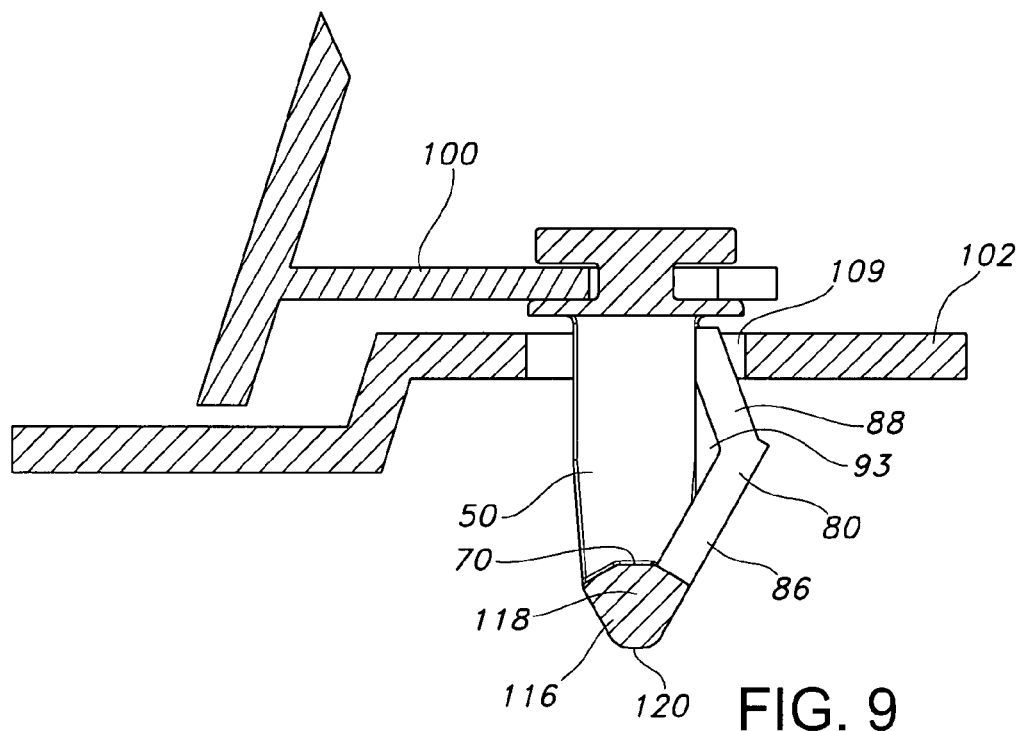
FIG. 9 is a cross sectional view of the panel fastener, molding and panel taken along line 9-9 in FIG. 7.
Figure 10:
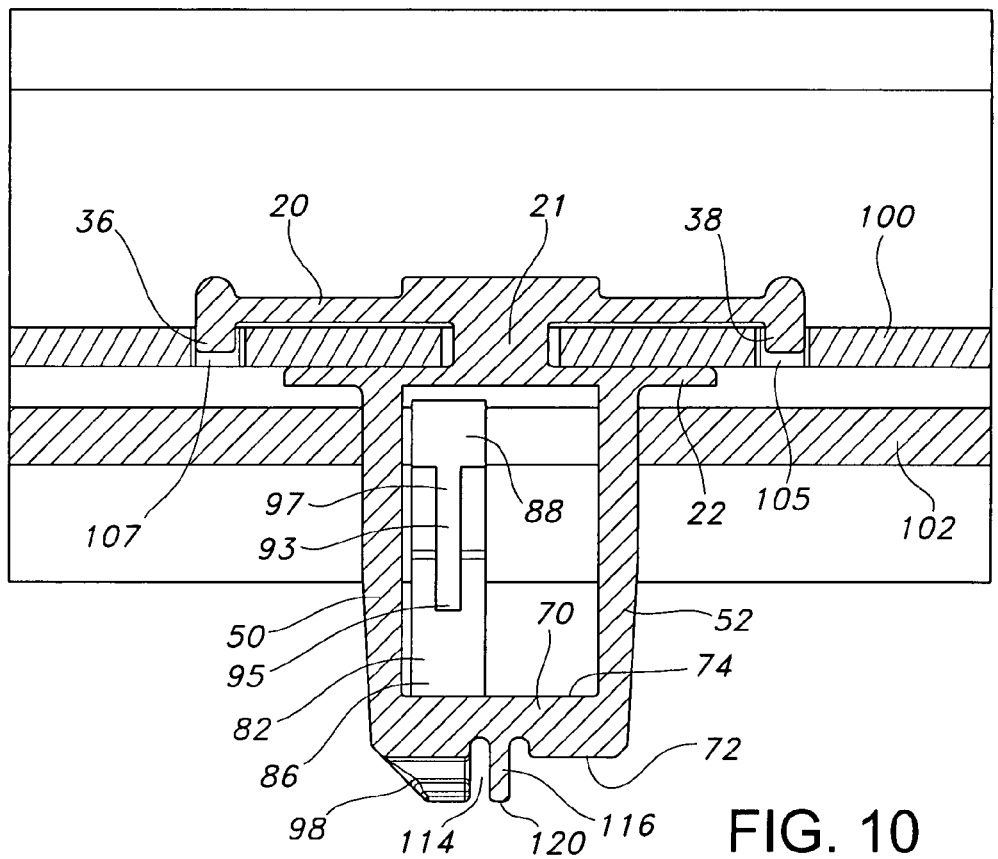
FIG. 10 is a cross sectional view of a panel fastener, molding and panel taken along line 10-10 in FIG. 7.

The retainer 10 is attached to the panel 102 by inserting the retainer through the slot 109 in the panel 102. As shown in FIG. 8, the retainer is aligned with the slot 109 and positioned such that that fin 116 and guide extensions 96, 98 (shown in FIG. 2) are adjacent to the slot 109. The retainer 10 is then inserted through the slot 109. As the retainer is inserted, the first portion 86 of the wings 80, 82 contacts the panel 102 and the wings 80, 82 flex inwardly until the retainer 10 is inserted past the first portion of the wings 80, 82. The angle of the second portion 88 of the wings 80, 82 then acts to hold the retainer in the slot 109, with the second portion 88 engaging the slot 109. The base 54 of the tapered posts 50, 52 (at width 62) substantially fills the slot 109 to prevent damage to the wings 80, 82, for instance, when a rotational force is placed on the retainer 10. The ledge 92 prevents the retainer 10 from being removed from the slot 109.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A w-based panel fastener for securing a molding to a panel, the panel fastener comprising:
    a head plate;
    a collar;
    a neck between said head plate and said collar, said neck defining a gap between said head and said collar;
    a pair of posts extending from said collar opposite said neck, said posts each including a distal end;
    a bridge joining said distal ends of said posts, said bridge having a longitudinal length between said posts, an inner surface facing said collar, an outer surface opposite said inner surface, and first and second lateral sides;
    first and second wings extending from said bridge generally toward said collar, said first wing adjacent said first lateral side, said second wing adjacent said second lateral side, said first and second wings being offset along said longitudinal length of said bridge;
    first and second guide extensions extending from said outer surface of said bridge, said first and second guide extensions separated from each other and defining a gap therebetween, said first guide extension positioned opposite said first wing, said second guide extension positioned opposite said second wing, and
    a fin extending outwardly from said outer surface of said bridge, said fin disposed in said gap between said first and second guide extensions, said fin separate and independent from said first and second guide extensions.

2. The panel fastener of claim 1 wherein said fin extends outwardly from said bridge at least as far as said first and second guide extensions, said fin terminating in an outer edge having a radius.

3. The panel fastener of claim 1 wherein said posts each include a base adjacent said collar, said posts each having a width that tapers from said base to said distal end, said width being perpendicular to said longitudinal length of said bridge.

4. The panel fastener of claim 1 wherein said head plate includes an upper surface facing said collar and a lower surface opposite said upper surface, said lower surface defining at least one notch for providing said head plate with a greater degree of flexibility in the location of said notch.

5. The panel further of claim 4 wherein said head plate includes at least one protrusion extending from said upper surface for interfitting with the molding.

6. A w-based panel fastener for securing a molding to a panel, the panel fastener comprising:
    a head plate;
    a collar;
    a neck between said head plate and said collar, said neck defining a gap between said head and said collar;
    a pair of posts extending from said collar opposite said neck, said posts each including a distal end;
    a bridge joining said distal ends of said posts, said bridge having a longitudinal length between said posts, an inner surface facing said collar, an outer surface opposite said inner surface, and first and second lateral sides;
    first and second wings extending from said bridge generally toward said collar, said first wing adjacent said first lateral side, said second wing adjacent said second lateral side, said first and second wings being offset along said longitudinal length of said bridge; and
    first and second guide extensions extending from said outer surface of said bridge said first and second guide extensions separated from each other and defining a gap therebetween, said first guide extension positioned opposite said first wing, said second guide extension positioned opposite said second wing;
    wherein said first and second wings each include a first portion and a second portion, said first portion extending from said bridge and angling outwardly from said posts, said second portion extending from said first portion and angling inwardly toward said posts;
    wherein said first and second wings include an outer surface, and a lip on said outer surface, said first and second wings each having a knuckle at the junction between said first and second portions, said lip located on said knuckle; and wherein said first and second wings include an inner surface opposite said outer surface, said inner surface having a rib extending outwardly therefrom, at least a portion of said rib extending from said first portion of each of said wings, and at least a portion of said rib extending from said second portion of each of said wings.

7. A w-based panel fastener for securing a molding to a panel, the panel fastener comprising:

a head plate;

a collar;

a neck between said head plate and said collar, said neck defining a gap between said head and said collar;

a pair of posts extending from said collar opposite said neck, said posts each including a distal end;

a bridge joining said distal ends of said posts, said bridge having a longitudinal length between said posts, an inner surface facing said collar, an outer surface opposite said inner surface, and first and second lateral sides;

first and second wings extending from said bridge generally toward said collar, said first wing adjacent said first lateral side, said second wing adjacent said second lateral side, said first and second wings being offset along said longitudinal length of said bridge; and first and second guide extensions extending from said outer surface of said bridge, said first and second guide extensions separated from each other and defining a gap therebetween, said first guide extension positioned opposite said first wing, said second guide extension positioned opposite said second wing;

wherein said first and second guide extensions each have an outer surface and an inner surface, said outer surfaces of said first guide extension being generally flush with said outer surface of said first wing, said outer surface of said second guide extension being generally flush with said outer surface of said second wing, said inner surface of each of said first and second guide extensions being concave.

8. A w-based panel fastener for securing a molding to a panel, the panel fastener comprising:

a head plate;

a collar;

a neck between said head plate and said collar, said neck defining a gap between said head and said collar;

a pair of posts extending from said collar opposite said neck, said posts each including a distal end;

a bridge joining said distal ends of said posts, said bridge having a longitudinal length between said posts, an inner surface facing said collar, an outer surface opposite said inner surface, and first and second lateral sides;

first and second wings extending from said bridge generally toward said collar, said first wing adjacent said first lateral side, said second wing adjacent said second lateral side, said first and second wings being offset along said longitudinal length of said bride; and first and second guide extensions extending from said outer surface of said bridge, said first and second guide extensions separated from each other and defining a gap therebetween, said first guide extension positioned opposite said first wing, said second guide extension positioned opposite said second wing;

wherein said first and second guide extensions each include an edge adjacent to one of said posts, each said edge angled inwardly from said post in the direction of said longitudinal length of said bridge.

9. A panel fastener for securing a molding to a panel, the panel fastener comprising:

molding attachment means for securing the fastener to a molding;

a collar connected to said molding attachment means;

a pair of posts extending from said collar;

a bridge joined between said posts, said bridge having an inner surface and an outer surface, a longitudinal length extending between said posts, and first and second lateral edges; and first and second wings extending from said bridge, said first and second wings each including a retaining portion extending from said inner surface of said bridge and an extension portion extending from said outer surface of said bridge, said first and second wings being offset from each other along said longitudinal length of said bridge such that they define a gap therebetween;

wherein at least one of said first and second wings includes a first portion angled away from said posts, a second portion angled toward said posts, an inner surface, and a support rib extending from said inner surface, a portion of said support rib extending from said first portion of said wing and a portion of said support rib extending from said second portion of said wing.

10. The panel fastener of claim 9 wherein said molding attachment means includes a neck attached to said collar, and a head plate attached to said neck, said head plate including at least one notch defining an area of reduced thickness in said head plate.

11. The panel fastener of claim 10 wherein said head plate includes two of said notches, said notches approximately symmetrically disposed on opposite ends of said head plate.

12. The panel fastener of claim 10 wherein said head plate includes a first surface facing said collar and a second surface opposite said first surface, said at least one notch defined in said second surface, said first surface including at least one protrusion extending outwardly from said first surface for interfitting with a window on the panel.

13. A panel fastener for securing a molding to a panel, the panel fastener comprising:

molding attachment means for securing the fastener to a molding;

a collar connected to said molding attachment means;

a pair of posts extending from said collar;

a bridge joined between said posts, said bridge having an inner surface and an outer surface, a longitudinal length extending between said posts, and first and second lateral edges;

first and second wings extending from said bridge, said first and second wings each including a retaining portion extending from said inner surface of said bridge and an extension portion extending from said outer surface of said bridge, said first and second wings being offset from each other along said longitudinal length of said bridge such that they define a gap therebetween; and a fin extending from said bridge, said fin disposed in said gap between said wings, said fin extending outwardly from said bridge beyond said first and second extension portions.

14. A panel fastener for attaching a molding to a panel, the panel having an opening for receiving the fastener, the fastener comprising:

a nose having a longitudinal length, an outer surface, and an inner surface opposite said outer surface;

first and second wings extending from said nose, said wings being spaced from each other along said longitudinal length of said nose, said wings each including a guide portion extending from said outer surface of said nose and a retainer portion extending generally from said inner surface of said nose, said guide portions of said wings being spaced apart along longitudinal length of said nose, said guide portions of said wings forming a surface for initial insertion into the opening in the panel, said retainer portions of said wings adapted to interfit with the opening to secure the fastener to the panel; and a collar, and a pair of posts extending from said collar and supporting said nose, said first and second wings each including a first portion angling outwardly from said posts and a second portion angling toward said posts, said second portion capable of engaging the panel at said opening to secure the fastener to the panel;

wherein said wings each include an outer surface for engaging the panel and an inner surface opposite the outer surface said wings each including a support rib extending from said inner surface, a portion of each said support rib extending from said first portion of said wing, and a portion of said support rib extending from said second portion of said wing.

* * * * *